BISTABLE OPTICAL LAMINATE

EQUIVALENT CIRCUIT

INVENTOR.
STEPHEN W. MOULTON
BY D P Pressman
ATTORNEY

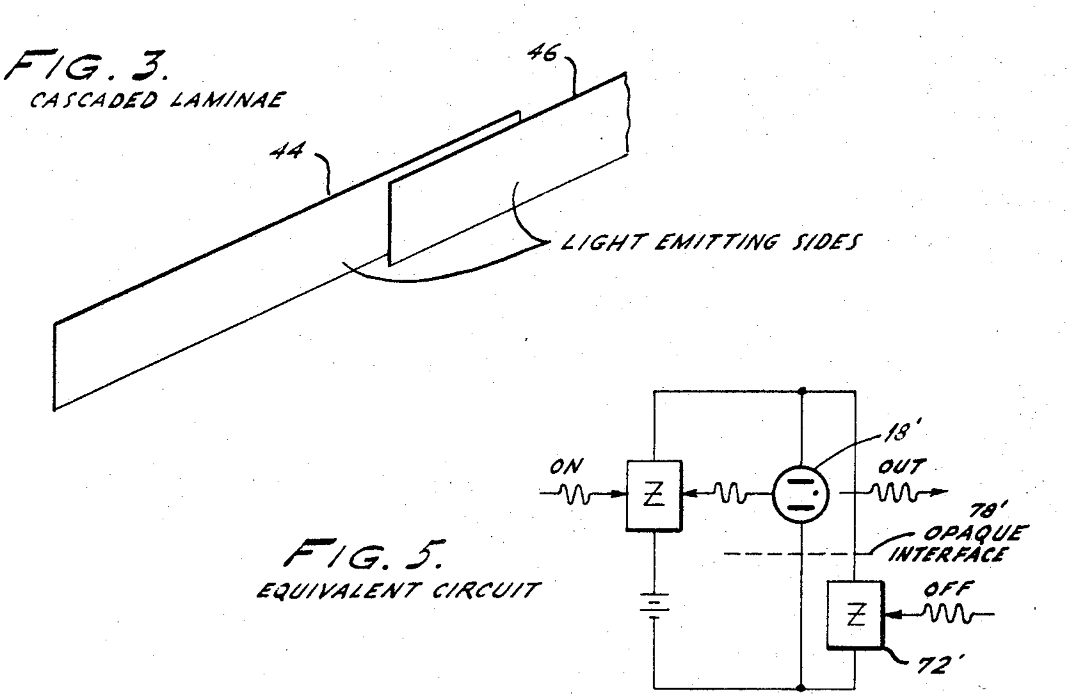
FIG. 3. CASCADED LAMINAE; FIG. 5. EQUIVALENT CIRCUIT
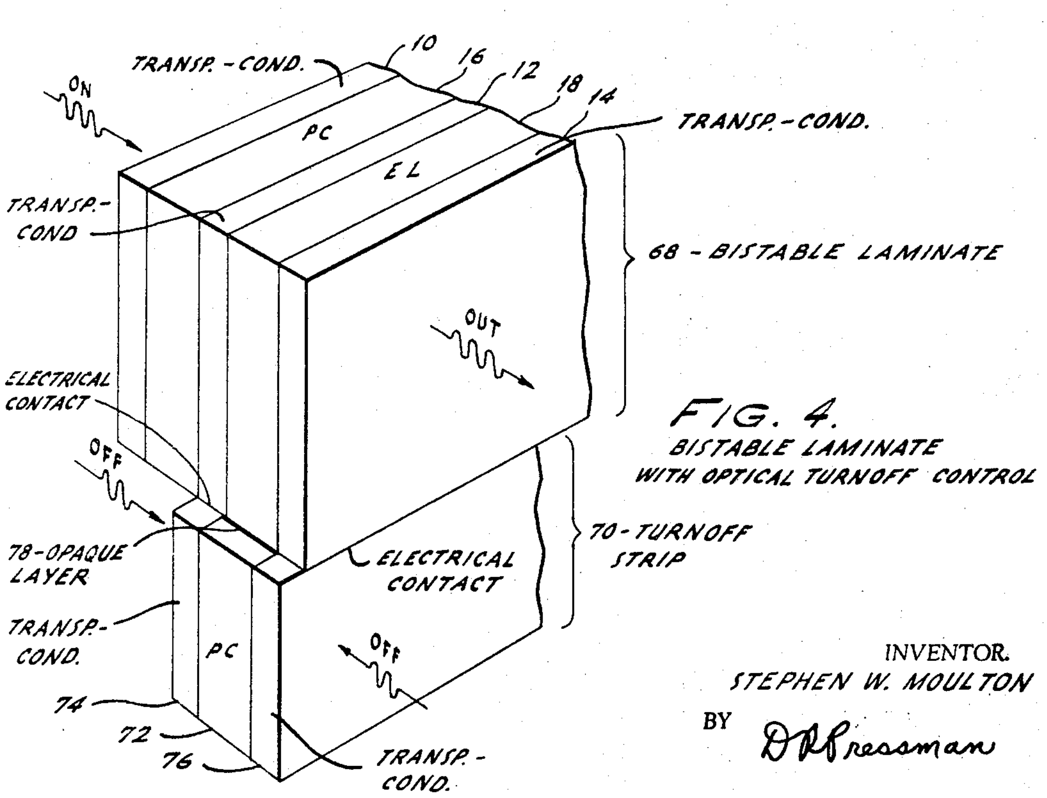
FIG. 4. BISTABLE LAMINATE WITH OPTICAL TURNOFF CONTROL
INVENTOR.
STEPHEN W. MOULTON
BY D. R. Pressman
ATTORNEY

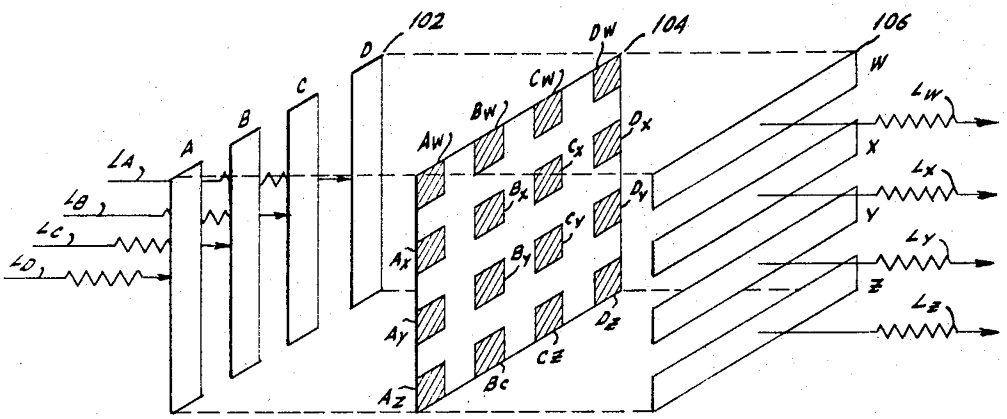
FIG. 6. LOGIC MATRIX EMPLOYING BISTABLE LAMINATES
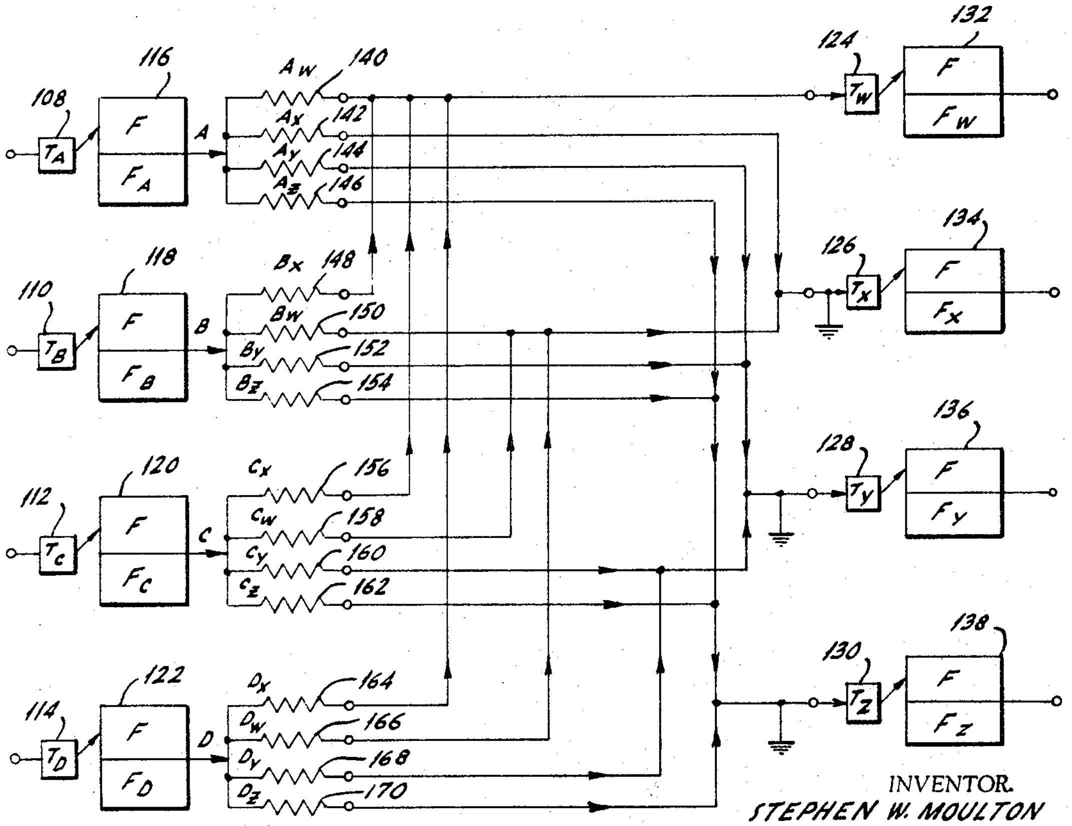
FIG. 7 EQUIVALENT CIRCUIT
INVENTOR.
STEPHEN W. MOULTON
BY D R Pressman
ATTORNEY

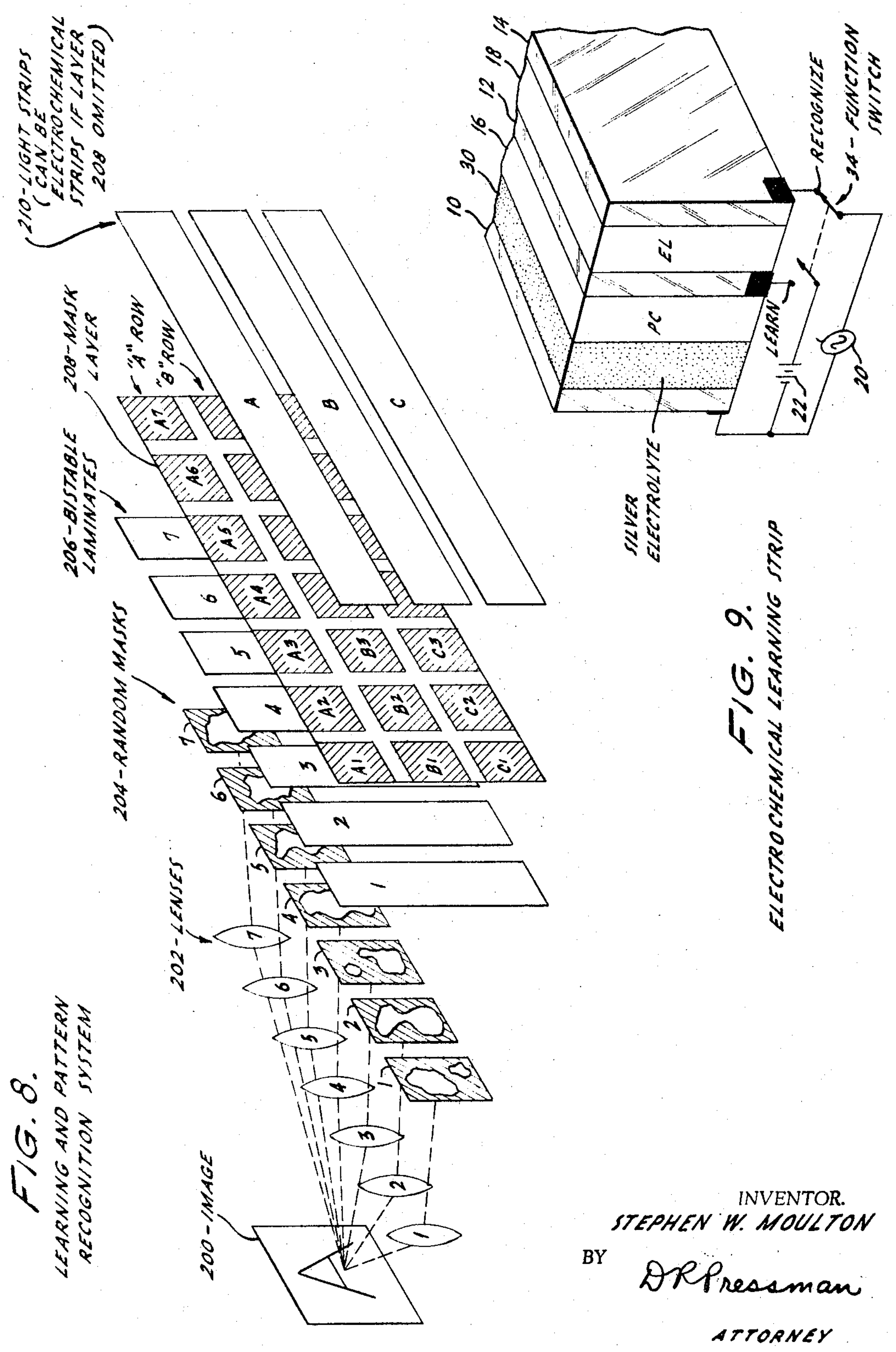
FIG. 8. LEARNING AND PATTERN RECOGNITION SYSTEM FIG. 9. ELECTROCHEMICAL LEARNING STRIP
INVENTOR.
STEPHEN W. MOULTON
BY D R Pressman
ATTORNEY United States Patent Office 3,422,270
Patented Jan. 14, 1969

3,422,270

LOGIC AND LEARNING/RECOGNITION SYSTEMS USING BISTABLE OPTICAL LAMINAE

Stephen W. Moulton, Fort Washington, Pa., assignor to Philco-Ford Corporation, a corporation of Delaware Filed Oct. 16, 1964, Ser. No. 404,369
U.S. Cl. 250—213 13 Claims
Int. Cl. H01j *31/50;* H01j *39/12;* H04q *9/00*

ABSTRACT OF THE DISCLOSURE

Logic and learning/recognition systems using bistable optical laminae. The laminae consist of a voltage source connected across three transparent, conductive layers sandwiching a photoconductive layer and an electroluminescent layer. The logic system uses two layers of bistable laminae sandwiching a mask layer. The learning/recognition system images randomly-occluded views of the unknown character on respective laminae of a first layer in which transmissivities of the masks have been adjusted in previous learning phase.

This invention relates to learning and pattern recognition systems and particularly to such a system employing a new type of optical laminate.

Systems for learning and pattern recognition are a comparatively recent innovation in electronics. One such hystem employing conventional logic circuitry is the subject of the application of A. Gamba, Ser. No. 106,670, filed May 1, 1961, now Patent 3,255,436, granted June 7, 1966; another such system employing optical logic circuitry is the subject of the application of J. S. Bryan, Ser. No. 226,100, filed Sept. 25, 1962. now Patent 3,248,552, granted Apr. 26, 1966 and assigned to the assignee of the present application.

These systems have a learning phase and an operational or pattern recognition phase. In the learning phase the system is acquainted with different members of individual pattern classes e.g., different type styles of the various letters of the alphabet. In the operational phase, the system uses probability theory to "recognize" patterns, i.e. classify patterns supplied thereto as belonging to certain classes, even if a particular pattern supplied was not used in the learning phase.

These systems require large numbers of identical circuit elements and great numbers of interconnecting in order to have a practical level of recognition accuracy. Obviously the systems thus becomes quite expensive, bulky, and complex when fabricated with conventional circuit elements. One solution to this problem is found with the optical logic system described in the application of Bryan, referred to supra, wherein use is made of the ability of a multiplicity of light rays to cross without interaction to obviate the problems encountered with complex conventional circuit interconnections. The present invention employs a novel form of optical laminate to perform the logic operations in a recognition system and thus obviate in a unique manner the disadvantages of conventional circuitry.

OBJECTS

Accordingly several objects of the present invention are:

(1) To provide a novel and improved learning and pattern recognition system, (2) To provide an optical logic system employing an optical laminate, and (3) To provide a novel and useful circuit element in the form of an optical laminate.

Many other objects and advantages of the invention will become evident from a consideration of the ensuing description.

SUMMARY

According to one preferred form of the present invention, a bistable optical laminate is provided which comprises first, second, and third transparent, conductive layers with a layer of photoconductive material sandwiched between the first and second conductive layers and a layer of electroluminescent material sandwiched between the second and third conductive layers.

Other preferred forms of the present invention will be discussed infra.

DRAWINGS

FIG. 3 shows a manner of extending the optical laminate of the invention.

FIG. 4 shows a bistable optical laminate having provision for optical turnoff.

FIG. 5 shows an equivalent circuit for the arrangement of FIG. 4.

FIG. 6 shows a logic matrix employing the optical laminate.

FIG. 7 shows an equivalent circuit for the matrix of FIG. 6.

FIG. 8 shows a learning and pattern recognition system according to the invention.

FIG. 9 shows an electrochemical optical laminate.

Figure 1:
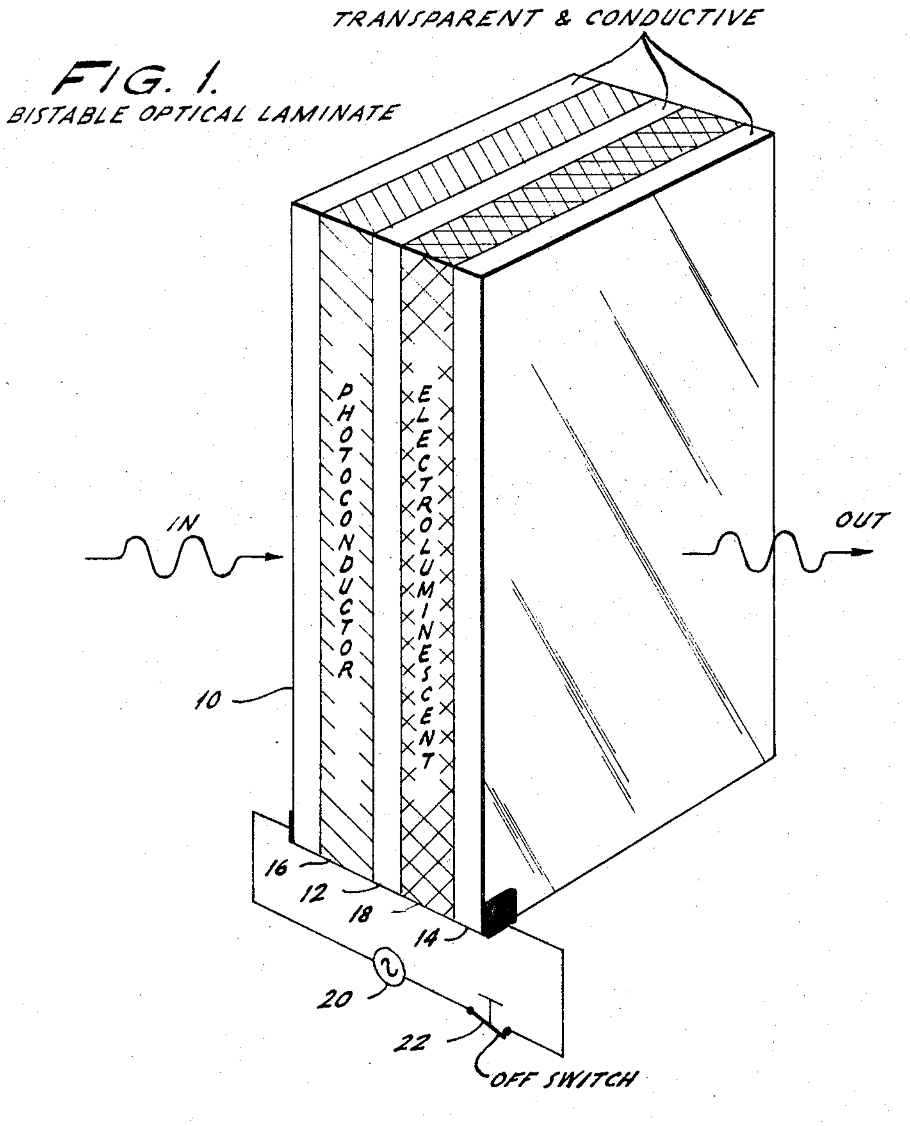
FIG. 1 shows a bistable optical laminate according to the invention.
Figure 2:
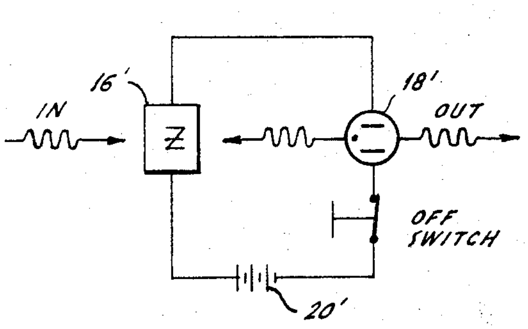
FIG. 2 shows an equivalent circuit for the laminate of FIG. 1.

FIGS. 1 and 2.—Bistable optical laminate

The bistable optical laminate of FIG. 1 is useful in optical logic circuitry. One side of the laminate "ignites" (lights up) when a predetermined amount of optical energy is made to impinge upon the other side thereof. The laminate can be extinguished by momentarily interrupting the power thereto.

The laminate which may be arrangeed in strip form, and includes three transparent, conductive layers: 10, 12, and 14. Between layers 10 and 12 is a layer of photoconductive (PC) material 16 which has a high impedance when dark and a substantially lower impedance when illuminated. Between layers 12 and 14 is an electroluminescent (EL) layer 18 which is dark unless a predetermined alternating voltage is applied thereacross, in which case the layer emits light. An alternating voltage 20 is connected by suitable contacts across layers 10 and 14. A normally closed pushbutton switch 22 is connected in the path of voltage source 20.

When no light is supplied to the face of layer 10, PC layer 16 will be dark and have ahigh impedance. A high impedance will thus be placed in series with source 20 and EL layer 18, and consequently EL layer 18 will be nonluminous.

If a predetermined level of light is momentarily applied to the face of layer 10, PC layer 16 will be illuminated, and the high series impedance between source 20 and EL layer 18 will be momentarily lowered, allowing practically the full voltage of source 20 to be applied across EL layer 18, rendering the same luminous. Layer 18 will remain luminous even after the light input to the face of layer 10 is terminated since the light from EL layer 18 will pass back through layer 12 to illuminate PC layer 16 and thus keep its impedance low. The light from EL layer 18 will also be sent out of the laminate through layer 14. If switch 22 is momentarily opened, the laminate will be extinguished. If switch 22 is thereafter reclosed, the laminate will remain off since the impedance of PC layer 16 will have risen to a value high enough to prevent source 20 from reigniting EL layer 18.

FIG. 2 shows an equivalent circuit which facilitates an understanding of the operation of the laminate of FIG. 1. The elements in the circuit of FIG. 2 have been given primed numbers similar to the numebrs of their counterparts in FIG. 1. The electroluminescent element 18 is represented by gas tube light source 18'.

When sufficient light is applied to photosensitive impedance 16', gas tube 18' will fire. Its light will maintain the impedance of 16' low, allowing tube 18' to remain lit.

The optical laminate of FIG. 1 is a threshold device which will ignite only if the face of layer 10 is illuminated with a sufficient amount of light. Several external light sources, each having an intensity less than the threshold value may be positioned along the length of laminate 10. In such an arrangement the laminate will ignite only if the total light reaching the laminate from all the light sources exceeds a predetermined threshold. It will thus be appreciated that the laminate can easily be arranged to perform majority logic. The laminate effectively can linearly add the various light inputs thereto and provide an output if its threshold level is exceeded.

FIG. 3.—Cascaded laminae

The light output from one optical laminate can be used to perform a variety of functions similar to the manner in which the output of a typical bistable circuit element (flip-flop) can be used. A plurality of photosensitive impedances can be placed along the output side of the laminate to sense its light output. If the laminate does not have sufficient area to accommodate all the photosensitive impedances to be used, its effective output area can be extended by cascading a plurality of laminae in the manner shown in FIG. 3.

Adjacent part of the light emitting side of a first laminate 44 is placed part of the light receiving side of a second laminate 46. When laminate 44 is ignited, the light therefrom will ignite laminate 46, thus providing additional light emitting area. The laminae can be connected to the same power source and switch for simultaneous extinguishment. The area of a laminate can be extended indefinitely by further cascading according to this method.

It is not necessary that the laminae take the strip form shown. Other shapes such as oblong, square, or even circular may be used.

FIG. 4.—Bistable laminate with optical turnoff control

A bistable laminate arrangement with a provision for optical turnoff is shown in FIG. 4. The bistable part of the arrangement, laminate 68, is identical to the laminate 10 of FIG. 1 and has been given the same reference numerals; its power supply is not shown. The laminate 70 affixed to the bottom of laminate 68 is arranged to extinguish laminate 68 when laminate 70 is illuminated. Thus light may be used to turn off as well as ignite laminate 68.

Laminate 70 consists of a photoconductive impedance layer 72 sandwiched between two transparent, conductive layers 74 and 76. The upper edges of layers 74 and 76 are electrically connected to the lower edges of layers 12 and 14, respectively. PC layer 72 is optically shielded from EL layer 18 by an opaque layer 78 at the interface.

Assume that laminate 68 is ignited. When light is made to impinge on either face of laminate 70, the normally high impedance of PC layer 72 will be lowered. Since PC layer 72 is connected in parallel with EL layer 18, the voltage across EL layer 18 will be lowered below the ignition level and EL layer 18 will be extinguished.

FIG. 5 shows the equivalent circuit for the arrangement of FIG. 4; corresponding elements in FIG. 5 have been given identical but primed reference numerals. It will be obvious that if the impedance of photosensitive impedance element 72' is sufficiently lowered, the voltage across 18' will fall below the level which will sustain conduction through tube 18'. This will extinguish tube 18' if previously fired or prevent the firing of tube 18' if initially nonconductive.

FIG. 6.—Logic matrix employing optical laminae

The arrangement of FIG. 6 demonstrates the versatility, economy and utility of the optical laminae when cascaded so that the output of one unit is applied to a plurality of others.

FIG. 6 is an exploded view of a three-layered arrangement. The first layer 102 consists of four spaced, coplanar, laminae designated A, B, C, and D. The second layer 104 comprises a mask having sixteen areas arranged to transmit varying degrees of light. The third parallel layer 106 consists of four spaced, coplanar, laminae designated W, X, Y, and Z, and arranged so that part of the light output from each laminate in layer 102 is supplied to each laminate in layer 106. The laminae have again been illustrated as having a strip-shaped configuration, but it will be apparent that laminae of other shapes may also be cascaded so that light from each member of the first layer will be suppiled to each member in the second layer. The three layers should be fabricated in a close stack so as to occupy little space and require a minimum of external shielding.

The 16 areas of mask 104 are arranged to be in optical alignment with the sixteen projected intersections of the laminae of layer 102 with the laminae of layer 106. The sixteen areas of mask 104 are each designated with a two letter reference composed of the letters of the two laminae it lies between. Thus, area AW, for example, is given that designation because it lies between strips A and W. The power supplies for the laminae have not been shown in order to simplify the drawing.

Each laminate in layer 102 can receive an optical input; thus four light inputs indicated are designated $L_A$, $L_B$, $L_C$, and $L_D$ in correspondence with the reference letters of their respective laminae. The laminae of layer 106 may provide four optical outputs, designated $L_W$, $L_X$, $L_Y$, and $L_Z$. Although only four laminae have been shown in each layer it will be understood that each layer may be comprised of many more or even less than four laminae, depending upon the function the system is to perform. Similarly more than three layers can be used with additional mask and light strip layers being added according to the level of matrix complexity desired. Each additional layer of optical laminae should be positioned so that selected strips of the added layer receive inputs from more than one strip of the preceding layer.

FIG. 7.—Equivalent circuit

The equivalent circuit for the optical matrix of FIG. 6, shown in FIG. 7, will facilitate an understanding of the optical matrix. Like reference letters have been used insofar as possible.

The circuit includes four input threshold units, 108, 110, 112, and 114, which each produce a standardized output only if their input voltage exceeds a predetermined threshold. The outputs of the threshold units are connected to the respective inputs of four bistable multivibrators (flip-flops) 116, 118, 120, and 122. An output from a threshold unit will shift the state of "set" its respective flip-flop. The flip-flops can be reset by manual or automatic means (not shown).

Four more identical threshold unit—flip-flop combinations are shown on the right hand side of FIG. 7. The threshold units are identified by even reference numerals from 124 to 130 and the flip-flops by even reference numerals from 132 to 138.

The individual combinations of threshold units 108, 110, 112, and 114 and their respective flip-flops 116 to 122 are counterparts of strips A to D of layer 102 in FIG. 6 as indicated by the subscripts. Similarly, threshold units 124, 126, 128, and 130 and their respective flip-flops

132, 134, 136, and 138 are counterparts of strips W to Z of layer 106 and as indicated by its subscripts.

The output of each of flip-flops 116, 118, 120, and 122 is connected by means of four weighting resistors to the inputs of the four threshold units 124, 126, 128, and 130. There are thus sixteen weighting resistors and these are given even reference numerals from 140 to 170. Each weighting resistor is also designated by two reference letters corresponding to the letters of the flip-flop and threshold unit which it interconnects. Thus resistor 152, for example, is designated "BY" since it connects the output of flip-flop B (118) to the input of threshold unit Y (128).

It will be recognized that the circuit matrix of FIG. 7 has wide utility in systems employing logical circuitry. For instance the logical "neuron" operation, in which a plurality of inputs are supplied to a threshold unit through a plurality of weighting resistors, can be provided using threshold units A, B, C, D, and W, flip-flops A, B, C, D, and W, and weighting resistors AW, BW, CW, and DW. Electrical inputs to threshold units A, B, C, and D which exceed threshold value will set some of all of flip-flops A, B, C, and D. The outputs of the set flip-flops will be supplied to threshold unit W via the respective weighting resistors AW, BW, CW, and DW, which may have individually selected values. If a predetermined number or if a preselected combination of flip-flops A to D are set (depending on the values of the weighting resistors), threshold unit W will receive a sufficient input and flip-flop W will be set to provide an output.

The complexity of the system can be increased if the remaining twelve weighting resistors, the threshold units X, Y, and Z, and the flip-flops X, Y, and Z are utilized. In this case four neuron circuits operating in parallel from the same inputs can be provided. The appropriate output flip-flop W, X, Y, or Z will be set when predetermined inputs or combinations thereof are energized It will be appreciated that the system of FIG. 7 is relatively complex, bulky, and costly. Eight flip-flops and threshold units, sixteen resistors, and numerous interconnections are required. The optical system of FIG. 6 fulfills the same function as the system of FIG. 7 while providing an extremely simple, compact, an inexpensive arrangement.

The laminae in layer 102 can be ignited by their individual optical inputs. The light output from each laminate passes through the four adjacent weighting areas of mask 104 to impinge on the four laminae of layer 106. An individual laminate in layer 106 will be ignited if a predetermined number or combination of laminae in layer 102 are ignited, depending on the transparencies of the four areas of mask 104 adjacent such laminate.

It will be appreciated that the advantages of the system of FIG. 6 vis-a-vis the system of FIG. 7 will be multiplied many times as the system complexity is increased.

FIG. 8.—Learning and recognition system

*Description*

The system of FIG. 8 is a learning and pattern recognition system which utilizes an optical matrix similar to that of FIG. 6. The operation of the system will be described for exemplary purposes with reference to its ability to recognize letters of the alphabet after an instructional phase in which different type styles of the various individual letters are viewed by the system.

A suitably illuminated image 200, represented by the letter A, is viewed by the system.

The structure of the actual system comprises a plurality of lenses 202, a plurality of masks 204 having apertures of random configurations, a optical laminae layer 206, a mask layer 208, and another optical laminae layer 210.

It will be appreciated that layers 206, 208, and 210 comprise a matrix similar to that of FIG. 6 Seven laminae have been shown in layer 206 and three laminae in layer 210 for purposes of facilitation of illustration, although in practice each of these layers will contain many more laminae than shown. Mask 208 has individual areas corresponding to the projected intersections of the laminae of layer 206 with the laminae of layer 210. The transparencies of the individual areas are determined during the learning phase of the system, as will be discussed infra.

The number of lenses 202 and masks 204 must correspond to the number of laminae in layer 206. Each lens is arranged to project the image 200 on one of masks 204. Light passing through each of the masks 204 is arranged to be projected on one of the laminae in layer 206. The masks in layer 204 are opaque with randomly distributed and shaped transparent areas such as shown. The transparent area of each mask should not be like that of any other mask. Alterntaively, in lieu of randomly shaped irregular transparent areas, the masks may have related, regularly shaped transparent areas, again arranged such that no two transparent areas are alike.

The layers 206, 208, and 210 are fabricated in a close stack so that no unwanted optical cross paths exist.

Recognition of a particular letter at the position occupied by image 200 is indicated by ignition of one of the correspondingly lettered laminae in layer 210. If an electrical, rather than an optical, output is desired, a plurality of photocells adjacent the output sides of the respective laminae of layer 210 can be used to provide, through a change in impedance, a voltaic indication that a particular laminate in layer 210 has been ignited.

OPERATION

*Learning phase*

During the learning phase, the system is caused to learn one letter at a time by supplying a variety of styles of each alphabetical letter to the system so that the characteristics common to each letter regardless of style can be recorded by the system. More particularly, the system is first arranged to "learn" the letter A in a manner to be described. The machine is then arranged to learn the letter B. After all the desired letters are "learned" by the system in this fashion, the system is then arranged for its recognition phase in a manner to be described.

Learning is accomplished by adjusting the transparencies of the individual areas of mask layer 208. A method of utilizing photographic film to provide a mask layer 208 with controllable area transparencies will be discussed, but it should be understood that any other suitable method of adjusting individual area transparency falls within the scope of the invention.

To set the machine in the learning phase, a sheet of unexposed film (protected from ambient light) is inserted in the position of layer 208. This film is covered by a mask which allows only the horizontal area of the film adjacent strip A of layer 210 to be exposed to the laminae of layer 206. With only this horizontal area of layer 208 unmasked and the rest of layer 208 protected from any external light, a predetermined number of samples (e.g., 50) of different styles of the letter A are placed in the position of image 200. Each sample is exposed for a fixed interval. The bistable strips in layer 206 are extinguished at the termination of each interval. This operation can be accomplished in several ways. For example, image 200 can be illuminated for a fixed interval and power to strips 206 can be supplied and terminated simultaneously with the power to the illuminating means. Also image 200 may be continuously illuminated and a shutter mechanism may be arranged to expose strips 206 for a fixed interval with power to strips 206 being terminated when the shutter is closed.

Next the previously exposed horizontal strip of layer 208 is covered and only a horizontal strip of layer 208 adjacent laminate B of layer 210 is uncovered and the same number of samples of the letter B then are placed in succession in the position of image 200 and "learned" by the system.

After all the desired characters are learned in this fashion the exposed film which comprises layer 208 is developed to provide a negative. This negative is then converted into a transparent positive wherein mask area transparency is proportional (logarithmically) to the exposure for that area. The exposure for each area will be determined by the percentage of the samples of any letter which pass enough light through the associated mask in layer 204 to exceed the threshold level of the associated strip in layer 206. For instance, assume that 50 samples of the letter A are shown to the system. Assume also that of these 50 samples, 80% or 40 reflect enough light through, mask #1 in layer 204 to ignite strip #1 in layer 206, 20% or 10 samples ignite strip #2, and 10% or 5 samples iginite strip #3 via mask #3. This will cause strip #1 to become ignited forty times or four times as long as strip #2 and 8 times as long as strip #3 during the instruction period. Thus sector A–1 of mask 208 will receive four times as much light as sector A–2 and eight times as much as sector A–3. In horizontal row A, area A–1, having received the most light, will be lighter than area A–2, which will be in turn lighter than area A–3 which had received the least light. Thus the transparency of mask 208 at any junction will be proportional to the logarithm of the percentage of samples of a pattern class which satisfy the criterion determined by the shape of the random area of the associated mask in layer 204.

RECOGNITION PHASE

When the learning phase is completed and an appropriately developed transparent positive mask layer 208 is positioned, the system is ready to recognize unknown letters.

When an unknown letter is placed in the position of image 200, an appropriate laminate in layer 210 will ignite to indicate the identity of the letter. (The ignited laminate may be indicated electrically by a change in impedance in one of a plurality of photoconductors which can be placed adjacent the respective laminates of layer 210 if desired.) The theory underlying the operation of the system is as follows:

The masks in layer 204 each represent a broad criterion. Satisfaction of selected combinations of these broad criteria represent identification of a particular pattern class, e.g., one of the letters previously learned by the machine. Due to the configurations of masks 204, each letter viewed by the system will ignite a different combination of laminae 206. This combination may not be exactly the same for every style of a particular letter, but the combinations for the various styles of the same letter will be quite similar and differentiable from the combinations ignited by different letters.

The light from the combination or combinations of strips 206 ignited by any letter is attenuated far less by the horizontal row of shaded areas in mask 208 corresponding to that letter from any other horizontal row of shaded areas. For instance if one type of letter A is placed in the position of image 200, a particular combination of laminae in layer 206 will be ignited thereby. The A horizontal row in mask layer 208 will transmit more light from layer 206 than any other horizontal row, since the A row will have its more transparent areas adjacent those laminae in layer 206 which represent letter A characteristics. The A laminate in layer 210 will thus receive far more light than any other laminate and will consequently ignite, while the other laminae in layer 210 will remain dark.

While the system has been described with reference to recognition of different alphabetical letters, it will be apparent that various other pattern classes such as photographs, cloud formations, drawings, topographical or celestial views, etc., may be learned and distinguished by the system.

It will be obvious that the greater the number of random masks in layer 204, the greater the accuracy of the system will be. If the system is designated to recognize, say, 26 classes of characters (e.g., for the 26 alphabetical letters) then layer 210 will of course consist of 26 laminae. To achieve a practical level of recognition accuracy, layer 206 should contain about several hundred individual laminae. Since layers 206 and 210 must occupy the same area, the laminae in layer 210 will have to be made longer than those in layer 206.

FIG. 9.—Electrochemical learning laminate

FIG. 9 shows an electrochemical learning laminate, a plurality of which may be used in lieu of mask layer 208 and layer 210 of FIG. 8. Those elements of the electrochemical laminate having counterparts in the laminate of FIG. 1 have been given like reference numerals.

The electrochemical laminate differs from the laminate of FIG. 1 by the inclusion of a layer 30 comprised of a silver electrolyte which is light sensitive when suitably biased. One terminal of a battery 32 is connected to one terminal of operating source 20, the other terminal of the battery being connectable to transparent, conductive layer 12 when a function switch 34 is in the LEARN position. When switch 34 is in the RECOGNIZE position, source 20 is connected to transparent, conductive layer 14. The electrolyte 30 may comprise a jelly, paste, or liquid which can be held in position by a plastic or other nonconductive film or layer covering the sides of the laminate.

Initially the electrolyte is arranged so that its metallic silver is plated onto PC layer 16, thus forming an semiopaque interface over layer 16. When switch 34 is in the LEARN position, the potential of battery 32 will be placed across electrolyte 30 and PC layer 16. During the learning phase electrolyte 30 will be exposed to the light from layer 206 in FIG. 7. The light will cause the plated metallic silver locally to revert back to solution in the electrolyte and gradually remove the opaque interface from selected areas on layer 16. The plated silver is thus initially an opaque mask which can assume local transparencies proportional to the amount of light striking individual areas during learning. The transparency will be logarithmically related to the exposure time since the rate of silver removal will increase with exposure. This is because removal of silver from the film covering PC layer 16 will allow light to hit layer 16 and decrease the conductivity thereof and place more voltage from source 32 across electrolyte 30.

After the learning phase is completed, switch 34 is thrown to the RECOGNIZE position. The electrolyte layer 30 will be effectively disabled since only an alternating voltage from source 20 will be applied thereto. The silver remaining on PC layer 16 will act as a masking row analogous to layer 208 of FIG. 7. The removal of the silver film from PC layer 16 will be local so that a plurality of masks of different transparencies aligned with the vertical lamance of layer 206 can be provided.

While there has been described what is at present considered to be the preferred embodiment of the invention it will be apparent that various modifications and other embodiments thereof will occur to those skilled in the art within the scope of the invention. Accordingly I desire the scope of the invention to be limited only by the appended claims.

I claim:

1. An optical logic arrangement comprising:

(a) a plurality of optical laminae arranged in a coplanar array, each laminate comprising first, second, and third transparent conductive members, a photoconductive member being sandwiched between said first and second members and an electroluminescent member being sandwiched between said second and third members, (b) another identical optical laminate arranged to receive light from each of said plurality of optical laminae, and (c) a plurality of separate means for separately controlling the quantity of light transmitted from each of said plurality of optical laminae to said other laminate.

2. A logical matrix comprising:

(a) a first group of bistable optical laminae each of which is arranged to emit a given light output in response to a predetermined level of illumination thereof and being parallel arranged in a coplanar array, (b) a second group of identical bistable optical laminae arranged in a coplanar array, said second group lying in a plane parallel to the plane of said first group, each member of said second group arranged to receive an input from each member of said first group, and (c) a plurality of separate means for separately controlling the amount of light transmittable from individual ones of said first group of laminae to each member of said second group of laminae.

3. The matrix of claim 1 wherein said means of clause (c) comprises a masking layer having a plurality of areas of individually adjusted light transmissivities, several of said areas arranged to control the light receivable by each of the laminae in said second group.

4. The matrix of claim 1 wherein said bistable optical laminae each comprise first, second, and third transparent, conductive strips, a strip of photoconductive material being sandwiched between said first and second strips and a strip of electroluminescent material being sandwiched between said second and third strips.

5. The invention of claim 3 further including an image, means for focusing light reflected from said image onto a plurality of opaque masks having randomly shaped transparent areas, said masks being arranged so that light passing through said transparent areas falls on respective ones of said first group of optical laminae.

6. The invention of claim 5 wherein said means recited in clause (c) of claim 6 comprises a photographic transparent positive having a plurality of areas of variable light transmissivities, several of said areas arranged to control the light receivable by each of the laminae in said second group.

7. In combination:

(a) a plurality of first means, each arranged to provide an optical output upon receipt of an optical input having at least a predetermined level, (b) second means for focussing randomly masked views of an image onto respective ones of said first means, (c) a plurality of third means, each arranged to provide a response upon receipt of an optical input of a predetermined level, each also arranged to sense an exclusive portion of the optical output of each of said first means, (d) fourth means for controlling the optical output transmittable by each of said first means to each of said third means and wherein (e) said first and third means each comprise laminae having first, second, and third transparent conductive layers, with a photosensitive impedance layer sandwiched between said first and second layers, and an electroluminescent layer sandwiched between said second and third layers.

8. The combination of claim 7 wherein said second means comprise a plurality of focussing lenses and a respective plurality of opaque masks having randomly shaped transparent areas.

9. The combination of claim 7 wherein said fourth means comprises a layer having a plurality of areas of variable light transmissivities.

10. In combination:

(a) first means for focussing a plurality of randomly partial-occluded views of an image onto a respective plurality of elongated optically sensitive threshold members each of which is arranged to emit a given light output in response to a predetermined level of illumination thereof and being parallel oriented in a first direction, (b) a second plurality of elongated optically-sensitive threshold members each of which is arranged to provide a given output in response to a predetermined level of illumination thereof and being parallel oriented in a second deirection orthogonal to said first direction each being positioned to receive light from a plurality of said first-named members, and (c) a mask layer interposed between said first-named plurality of members and said second plurality of members and having a plurality of areas of different optical transmissivities equal in number to and positioned coincident with the projected intersections of said first-named plurality of members with said second plurality of members.

11. A combined optically-sensitive threshold member and controllable mask therefor for use in a learning and recognition system, comprising:

(a) first, second and third transparent and conductive layers, (b) an electroluminescent layer sandwiched between said first and second layers, (c) a photoconductive layer and a layer of conductive photosensitive electrolyte sandwiched between said second and third layers with said photoconductive layer adjacent said second layer and said electrolyte layer adjacent said third layer, and (d) means for applying alternatively (1) a direct voltage across said second and third layers, whereby the zonal optical transmissivities of said emulsion layer can be adjusted by shining predetermined amounts of light in various portions thereof, or (2) an alternating voltage source across said first and third layers whereby a bistable optical laminate including a masking layer with a plurality of different masking areas will be provided.

12. A system for viewing individually members of various spatial pattern classes and determining to which class each member belongs, comprising:

(a) a plurality of first optical laminae each arranged to provide an optical output if the optical input thereto exceeds a predetermined threshold, (b) a plurality of randomly apertured opaque masks, (c) first means for projecting a plurality of views of a pattern image through respective ones of said masks and onto respective ones of said optical laminae, (d) a plurality of second optical laminae, each arranged to provide an output if the optical input thereto exceeds a predetermined threshold, and each arranged to receive a plurality of optical inputs each plurality consisting of an optical input from each of said first optical laminae, and (e) second means for separately controlling the optical energy transmitted by each of said first laminae to each of said second laminae.

13. In combination:

(a) a first transparent conductive layer, (b) a layer of a photosensitive electrolyte adjacent said first layer, (c) a layer of a photosensitive impedance adjacent said photosensitive electrolyte, (d) a second transparent conductive layer adjacent said photosensitive impedance, (e) a layer of an electroluminescent material adjacent said second layer, (f) a third conductive transparent layer adjacent said electroluminescent material, (g) means for supplying selectively a direct voltage across said first and second transparent, conductive layers, whereby the zonal optical transmissivities of said electrolyte layer can be adjusted by shining a plurality of controlled-energy optical inputs thereon, and (h) means for selectively supplying an alternating voltage across said first and third transparent, conductive layers to provide a bistable laminate.

References Cited

UNITED STATES PATENTS

| | | | |
|---|---|---|---|
| 1,375,474 | 4/1921 | Snelling | 250—211 X |
| 1,907,124 | 5/1933 | Ruben | 250—213 X |
| 2,692,948 | 10/1954 | Lion | 250—213 X |
| 2,999,165 | 9/1961 | Lieb | 250—213 X |
| 3,015,034 | 12/1961 | Hanlet | 313—108.1 X |
| 3,125,681 | 3/1964 | Johnson | 250—209 X |
| 3,248,552 | 4/1966 | Bryan | 250—213 X |

OTHER REFERENCES

Sponsler: IBM Technical Disclosure Bulletin; vol. 3, No. 4, September 1960, pp. 61, 62. 250–213A.

WALTER STOLWEIN, *Primary Examiner.*

U.S. Cl. X.R.

340—166; 250—209